Oct. 28, 1969  A. B. HOLMES  3,474,966
MECHANICAL WALL ATTACHMENT DIVERTER VALVE
Filed March 1, 1968

*INVENTOR,*
*ALLEN B. HOLMES*

BY Harry M. Saragovitz
Edward J. Kelly, Herbert Berl
& Serald L. Lett
ATTORNEYS

United States Patent Office 3,474,966
Patented Oct. 28, 1969

3,474,966
MECHANICAL WALL ATTACHMENT DIVERTER VALVE
Allen B. Holmes, Rockville, Md., assignor to the United States of America as represented by the Secretary of the Army
Filed Mar. 1, 1968, Ser. No. 709,655
Int. Cl. B64c 15/04
U.S. Cl. 239—265.27                                     5 Claims

ABSTRACT OF THE DISCLOSURE

A valve for diverting the flow of hot gases utilizing a movable vane for accomplishing the flow diversion but in which no mechanical seals are provided to prevent gas flow in the undesired direction. A gap is provided between the diverter vane and the valve casing which functions as a nozzle allowing a small percentage of valve flow gases to expand therethrough and attach to the outer wall of the deflecting vane. The gases leaking between the top, bottom and end of the deflecting vane are entrained, captured and ducted through the secondary exhaust port parallel to the primary exhaust port in the direction of desired flow.

BACKGROUND OF THE INVENTION

In certain V/STOL aircraft and in other applications there is a need to divert the flow of hot gases operating at a relatively high velocity. For example, in V/STOL aircraft a mechanical diverter valve is used to direct the flow of propulsion gases to alternate ducts; that is, the gases are directed to one duct to operate the fan while the craft is operating in the hover mode, they are directed to another duct to propel the craft while it is operating in the jet mode.

The valves presently used for this purpose which have large movable vanes for diverting the gases have serious deficiencies. As will be appreciated by those skilled in the art, the movable vane used to divert the gas flow will need to be designed so that in each of its operating positions the valve will be sealed so that gas will proceed out the desired duct only. Failure to accomplish this objective will result in gas leakage to the nonoperating duct resulting in reduced valving efficiency, as well as a reduction in the overall efficiency of the system. Further, leaking hot gases can cause serious damage to metal parts in the propulsion system. Conventional valves used for this purpose require expensive, precision-machined, close-fitting parts to achieve the desired mechanical seal. Still, the results have not been satisfactory. After a short period of operation, the large movable vanes in these valves are subject to thermal distortion resulting in gas leakage, the principal problem these valves were designed to eliminate.

An attempt to overcome the problems encountered with the use of mechanical movable vanes in such diverter valves was made by using fluid amplifier or fluidic techniques. The fluidic diverter valve used was a bistable device having two circular flow output passages, two control input channels, and one axis-symmetric power nozzle. The device uses the wall attachment (Coanda) effect to direct a stable flow to one of the output passages. When a suitable flow is introduced through the control input in the attachment wall, the power is deflected to the other output. The development of this device, however, was accompanied by a very serious problem. Fluidic valves demonstrated an inability to preserve the momentum of the flow between the supply and discharge ports due primarily to frictional losses that occur when flow is transported from the catcher inlet to the exhaust ports, as well as viscous spreading. Obviously this results in decreased valving efficiency. Valving efficiency for this purpose is defined as:

$$N = \frac{T_O}{T_N} \quad (1)$$

where:

$T_N$=isentropic thrust that could be computed for a fully optimized supply nozzle and,
$T_O$=measured thrust generated by the expulsion of gases from the output port. Experiments with the fluidic valve have shown that only rarely will the recoverable thrust exceed 75 percent of the computed isentropic value.

Ideally maximum energy recovery will be achieved in such valves when the jet flow is transported to the output port at low velocities because the frictional pressure drop along the walls of the flow transport channel increase with the square of the flow velocity. One method for reducing flow velocities in the fluidic valve would be by "loading" the output ports, that is by reducing the area of the discharge port in relation to the area of the transport channel. However, loading a fluidic device significantly alters its switching characteristics, and this factor offsets any increase in the efficiency of the device. While the efficiency of the fluidic valve, as set forth above, may be tolerable in some applications, it is not suitable in aircraft propulsion systems and many other applications.

It is therefore an object of this invention to provide a valve for diverting the flow of hot gases in which there will be no flow leakage.

Another object of this invention is to provide a valve for diverting the flow of hot gases in which it is not required that mechanical seals or close-fitting parts be used for preventing flow leakage.

A further object of this invention is to provide a valve for diverting the flow of hot gases of improved efficiency while attaining the above objects.

Still another object of this invention is to provide a valve for diverting the flow of hot gases capable of operating over a wide range of pressure ratios and having reduced load sensitivity.

Another object of this invention is to provide a valve for diverting the flow of hot gases which is capable of achieving a 100 percent flow diversion between output ports.

SUMMARY OF THE INVENTION

The aforementioned and other objects are obtained by employing the boundary layer wall attachment effect in conjunction with a conventional mechanical flow diverter. A movable vane diverts the gas flow from one exhaust duct to another; however, no mechanical seals are provided to prevent gas flow in the undesired direction. This function is accomplished by a gap between the vane and the valve casing which acts like a nozzle. The gases expanding through the nozzle attach to the outer wall of the deflecting vane and entrain any flow that leaks past the deflector and are captured and ducted through a secondary exhaust port parallel to the primary exhaust port in the direction of desired flow. Because a large percentage of the gas flow can be at a low velocity, high efficiency operation is maintained.

BRIEF DESCRIPTION OF THE DRAWINGS

The specific nature of the invention as well as other objects, aspects, uses and advantages thereof will clearly appear from the following description and the accompanying drawing in which.

DESCRIPTION OF A PREFERRED EMBODIMENT

Figure 1:
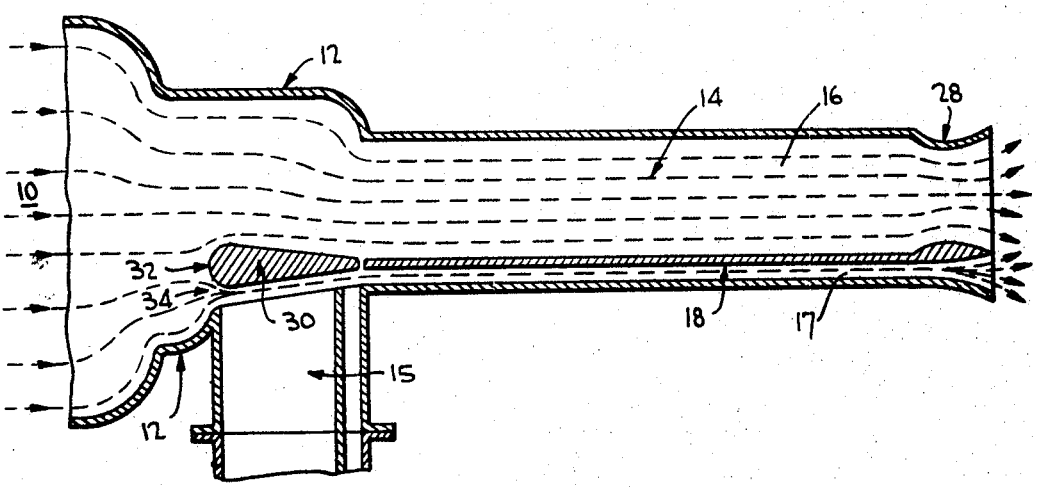
FIGURE 1 is a cross-sectional side view of a preferred embodiment of the diverter valve of my invention showing gas flow in a first mode of operation.

In FIGURE 1 a preferred embodiment of the valve of my invention is shown in a first mode of operation. Hot gases enter the valve from a supply chamber 10. A vane 30 is positioned so that gas flow is directed through duct 14 and substantially blocked from entering duct 15. It will be noticed, however, that tip 32 of vane 30 does not touch casing 12 of the valve, and therefore, no seal is provided to prevent gases from leaking through the opening between vane 30 and casing 12 into duct 15. The gap between tip 32 and vane 30 and casing 12 forms a nozzle 34 through which the leaking gases expand. Utilizing the boundary layer wall attachment effect, well known to those skilled in the art, the gases expanding through nozzle 34 attach to the outer wall of vane 30 and the flow of leaking gases is exhausted through a secondary exhaust duct 18.

The primary flow 16 is transported through duct 14 at a low velocity by means of a load nozzle 28 having an area much smaller than the area of duct 14. The gases allowed to expand through nozzle 34 form a high velocity secondary flow 17 through secondary exhaust duct 18. It is by this means that the need for mechanical seals is removed. Any leakage between vane 30 and casing 12 is directed out through secondary exhaust duct 18 as recoverable thrust.

Figure 2:
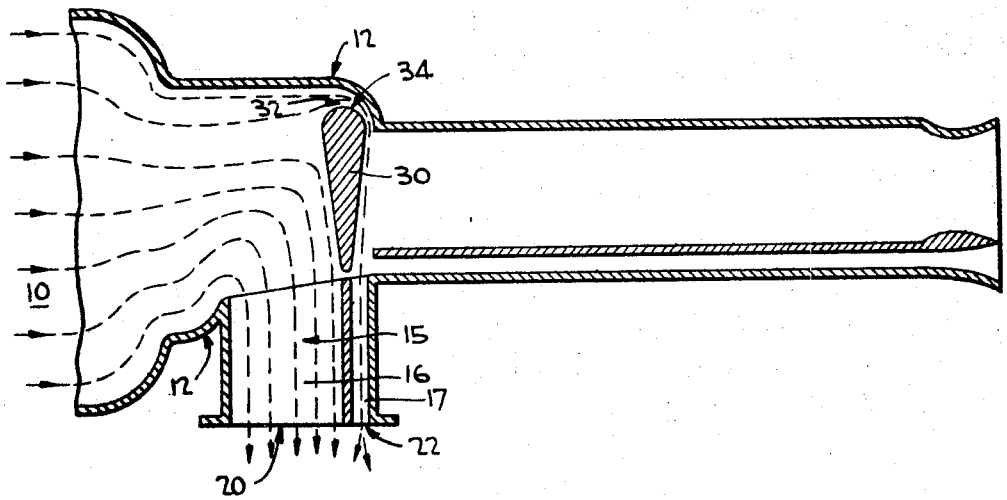
FIGURE 2 is a cross-sectional side view of the same preferred embodiment of the diverter valve of my invention showing gas flow in a second mode of operation.

In FIGURE 2 in which like numbers refer to like elements as in FIGURE 1 is shown the preferred embodiment of the diverter valve of my invention in the second mode of operation. Vane 30 has been rotated to a vertical position thereby diverting the gas flow to duct 15 and exhaust port 20. Again, a nozzle 34 has been created between valve casing 12 and tip 32 of vane 30. Leaking gases expand through nozzle 34, attach to the outer wall of vane 30 as in FIGURE 1 and are directed out exhaust port 22. The result, as in FIGURE 1, is a primary low velocity flow 16 and a secondary high velocity flow 17 of the leaking gases.

The mechanical wall attachment diverter valve described hereinabove provides a means by which a high percentage of the total valve flow can be diverted at a low velocity, and, consequently, a minimum pressure drop and maximum efficiency will be realized. Certainly the leaking gas or secondary flow which is entrained in the secondary ducts will be flowing at a high velocity and, consequently, at a lower efficiency. But this factor can be tolerated because of the relatively small amount of gas flowing at the higher velocity. For example, the efficiency of the valve of my invention can be computed as follows:

$$N = \frac{\frac{W_1 N_1}{W_1 + W_2} + \frac{W_2 N_2}{W_1 + W_2}}{\frac{W_1}{W_1 + W_2} + \frac{W_2}{W_1 + W_2}} \quad (2)$$

where:

$N$ = the efficiency of the valve,
$W_1$ = the primary flow,
$W_2$ = secondary flow,
$N_1$ = the efficiency of the primary recovery factor, and
$N_2$ = the efficiency of the secondary recovery factor.

Because the denominator of Equation 2 equals one that equation may be written:

$$N = \frac{W_1 N_1}{W_1 + W_2} + \frac{W_2 N_2}{W_1 + W_2} \quad (3)$$

Experimentation with valves such as that described herein have shown that $N_2$, the secondary recovery efficiency, will be approximately equal to 0.70. The primary efficiency $N_1$ is a function of the pressure drop across the valve. Because very low flow velocities can be employed by maintaining the proper duct to nozzle area ratio (2 to 1 for a velocity of approximately 300 feet per second), it is estimated that the net primary efficiency could be approximately 0.95. Assuming a secondary to primary flow ratio of .05 and substituting the values into Equation 3 the following is obtained:

$$N = 0.95 \times 0.95 + 0.05 \times 0.70$$
$$= 0.9025 + 0.0350$$
$$= 0.9375$$

It is therefore apparent that the lower efficiency secondary flow has little effect on the overall high operating efficiency of the valve.

The description and analysis presented above demonstrate that the mechanical wall attachment diverter valve of my invention has a greater efficiency than the fluidic valves described above. Further, while using the mechanical movable vane principle of diverting gas flow, the need for mechanical seals and precision machined parts is completely eliminated along with leakage due to thermal distortion of the movable vane.

While my invention has been described in the context of its application as a means if diverting high temperature turbojet exhaust flows, it will be apparent to those skilled in the art that the valve of my invention may be utilized to great advantage in many other applications. Further, it will be apparent that the embodiment shown herein is only exemplary and that various modifications can be made in construction and arrangement within the scope of the invention.

I claim as my invention:

1. In a valve for diverting the flow of fluids from a source of supply through one of a plurality of primary exhaust ducts of the type which utilizes a movable vane for directing flow through a preselected operative duct by substantially blocking the nonoperative ducts and deflecting said fluid flow through said operative duct, the improvement comprising:

(a) a plurality of secondary exhaust ducts communicating with said source of supply with one of said secondary exhaust ducts running parallel to and being coterminous with each of said primary exhaust ducts;

(b) said movable vane having such dimensions that in any of its operating positions an opening remains between an end and the sides of said movable vane and a wall of said valve allowing a small portion of the fluid to leak through said opening in the direction of said nonoperating ducts; and (c) said opening forming a nozzle directing said leaking fluid through the secondary exhaust duct associated with said operating primary exhaust duct.

2. The improved diverter valve of claim 1 in which said movable vane has the proper dimensions and is positioned so that leaking fluid is directed from said opening to said secondary exhaust duct by means of the boundary layer wall attachment effect.

3. The improved diverter valve of claim 1 having a load nozzle attached to the output of each of said primary exhaust ducts permitting said fluid to be transported through said primary exhaust ducts at a low velocity and discharged to the atmosphere at a high velocity.

4. A valve means for diverting the flow of fluids, comprising:

(a) an inlet means;

(b) a plurality of primary exhaust ducts communicating with said inlet means for transporting said fluid to the atmosphere;

(c) a plurality of secondary exhaust ducts communicating with said inlet means, with one of said secondary exhaust ducts running parallel to and being coterminous with each of said primary exhaust ducts and having a wall of each said primary exhaust duct forming a wall of the secondary exhaust duct associated therewith; and (d) a movable vane for diverting said fluid flow through a preselected one of said primary exhaust ducts by substantially blocking the other of said primary exhaust ducts and by deflecting said fluid flow into said one primary exhaust duct, (1) said movable vane being positioned so that in any of its operative positions it forms an extension of the wall between the primary exhaust duct through which said fluid flow is being diverted and the secondary exhaust duct associated therewith, and (2) said movable vane having such length and width that an end and the sides of said vane and a wall of said valve form a nozzle through which a small portion of said fluid can pass attaching to the outer wall of said vane and being directed to said secondary exhaust duct associated with said one primary exhaust duct.

5. The valve means for diverting flow of fluids of claim 4 having a load nozzle attached to the output and on each of said primary exhaust ducts permitting said fluid to be transported through said primary exhaust ducts and a low velocity and discharged to the atmosphere at any high velocity.

References Cited

UNITED STATES PATENTS

| | | | |
|---|---|---|---|
| 2,774,554 | 12/1956 | Ashwood et al. | 239—265.29 |
| 2,947,501 | 8/1960 | Flint | 239—265.29 |
| 3,000,178 | 9/1961 | Logerot | 239—265.17 |
| 3,380,660 | 4/1968 | Markowski | 239—265.27 |

EVERETT W. KIRBY, Primary Examiner

U.S. Cl. X.R.

60—232; 239—265,29, 265.13; 244—52